United States Patent

Kodaira et al.

[15] 3,690,232
[45] Sept. 12, 1972

[54] PHOTOGRAPHIC CAMERAS

[72] Inventors: Kiju Kodaira, Tatsuno; Hirofumi Yoshimura, Kamo, both of Japan

[73] Assignee: Yashica Company, Limited, Tokyo, Japan

[22] Filed: March 24, 1971

[21] Appl. No.: 127,531

[30] Foreign Application Priority Data

March 27, 1970 Japan ..................45/28718
March 27, 1970 Japan ..................45/28719

[52] U.S. Cl..............................95/10 CE, 95/10 CT
[51] Int. Cl.............................................G03b 7/08
[58] Field of Search...................95/10 CE, 10 CT

[56] References Cited

UNITED STATES PATENTS 3,555,984 1/1971 Rentschler.....................95/10
3,578,765 5/1971 Kobayashi.....................95/10

*Primary Examiner*—Samuel S. Matthews
*Assistant Examiner*—Michael L. Gellner
*Attorney*—Chittick, Pfund, Birch, Samuels & Gauthier

[57] ABSTRACT

A camera having a photosensitive element connected in an electric circuit for calculating the quantity of light exposure, a ring rotated with the desired exposure setting condition, a tear drop type light adjusting element adjustably connected to the ring in accordance with the photosensitivity of the photographic film used for varying the quantity of light received by the photosensitive element, a circuit constant setter in the calculation circuit, and successive contacts which are engaged in accordance with the relative position between the fixed portion of the camera and the tear drop type light adjusting element to control the circuit constant setter. The light adjusting element is provided with a tear drop shaped opening so shaped that when using a film having a photosensitivity less than a predetermined value, the circuits constants are not varied but only the quantity of the light impinging upon the photosensitive element is varied, whereas when using a film having a photosensitivity higher than the predetermined value, variation of the light quantity upon the photosensitive element and of the circuit constants are effected sequentially.

5 Claims, 5 Drawing Figures

PHOTOGRAPHIC CAMERAS

BACKGROUND OF THE INVENTION

The present invention relates to a photographic camera including a mechanism for calculating the quantity of light exposure that can respond to a wide range of photosensitivity of the films, and more particularly to an improved mechanism for calculating the quantity of light exposure especially useful for use in a photographic camera including an electric shutter or a transistorized exposure meter.

Recently, the photosensitivity of photographic films has been improved significantly. For example, films having a photosensitivity of ASA 400 or ASA 800 are now available on the market. However, the prior art film sensitivity switching mechanism designed for use in a camera provided with an electric shutter or a transistorized exposure meter in which the quantity of light exposure is primarily determined by the extent of opening of the iris belongs to a type quite different from the mechanism interlocked with an iris ring or a shutter speed ring for adjusting the quantity of the light impinging upon a photosensitive element or a so-called tear drop type light adjusting element, and such a film sensitivity switching mechanism is constructed such that the circuit constant of the electric shutter is selected by an independent switching button. With this construction, however, it is necessary to provide for a camera both the film sensitivity switching mechanism and tear drop type light adjusting element which of course not only complicates the construction of the camera but also requires limiting the number of the electric contacts and associated electrical elements of the film sensitivity switching mechanism from the standpoint of the dimension thus limiting the number of switchings. For this reason, it is impossible to provide a switching mechanism capable of responding to a wide range of film photosensitivity from ASA 12 to ASA 3,200. From the standpoint of light value, it may be possible to construct the switching mechanism so as to cause it to respond to the highest photosensitivity of the film by utilizing the fully opened position of the tear drop type light adjusting element. With this construction, however, as the photosensitivity of a photosensitive CdS element varies exponentially the minimum opening of the iris of the tear drop type light adjusting element will be about a fraction of 1 millimeter. It is difficult to provide such an element at high accuracies. Moreover, the CdS element utilized as the light receiving element requires a response time of about 10 to 20 seconds which is not suitable for practical use.

SUMMARY OF THE INVENTION

The principal object of this invention is to provide an improved mechanism for calculating the quantity of light exposure which is simple in construction and can respond to a wide range of the photosensitivity of photographic films.

Another object of this invention is to provide a photographic camera of the electric shutter type capable of utilizing films of a wide range of the photosensitivity.

A further object of this invention is to provide a photographic camera including a transistorized exposure meter capable of responding to films of a wide range of photosensitivity.

Briefly stated, these and other objects can be accomplished by this invention by providing a mechanism comprising a photosensitive element connected in an electric circuit for calculating the quantity of light exposure; a ring rotated in accordance with the desired exposure setting condition that is either one of the values of the spot and the shutter speed of the camera; a tear drop type light adjusting element adjustably connected to the ring in accordance with the photosensitivity of a photographic film used for the camera for varying the quantity of light received by the photosensitive element; means for releasably locking the light adjusting element in the adjusted position; a circuit constant setter in the calculating circuit; and switching means for switching the circuit constant setter in accordance with the relative position between the fixed portion of the camera and the tear drop type light adjusting element; the tear drop type light adjusting element having an opening so shaped that when using a photographic film having a photosensitivity less than a predetermined value, the switching mechanism is not actuated but only the quantity of the light impinging upon the photosensitive element is varied, whereas when using a photographic film having a photosensitivity higher than the predetermined value, the actuation of the switching means and the variation of the light quantity upon the photosensitive element are effected sequentially.

BRIEF DESCRIPTION OF THE DRAWINGS

The invention can be more fully understood from the following description when taken in conjunction with the accompanying drawings in which.

DESCRIPTION OF THE PREFERRED EMBODIMENTS

Figure 1:
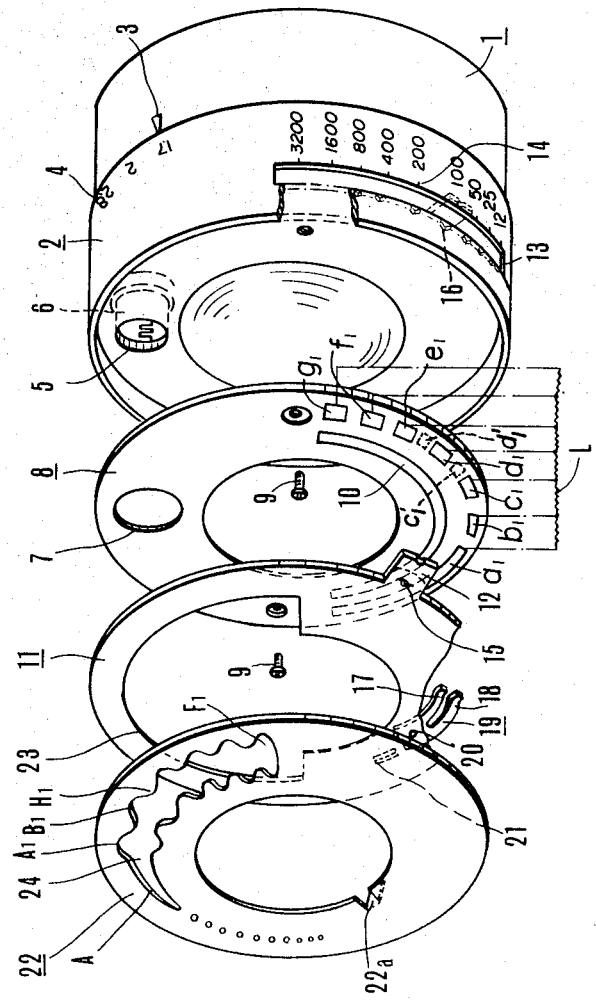
FIG. 1 shows an exploded view of an electric shutter mechanism applied to a photographic camera and constructed in accordance with the teaching of this invention.

The electric shutter mechanism shown in FIG. 1 comprises a lens cylinder 1 having an iris ring 2 mounted on the lens cylinder to be rotatable relative thereto and which can be set at any angular position by means of a click mechanism, not shown. Any desired opening of the iris can be selected by cooperation of an arrow mark 3 on the periphery of the lens cylinder 1 and a scale 4 applied on the periphery of the iris ring 2.

A photosensitive element 6, typically a CdS element is housed in the front portion of lens cylinder 1 to receive light through an opening 5. An annular printed circuit board of electric insulator 8 having a window 7 at a position corresponding to CdS element 6 is secured to the front surface of lens cylinder 1 by means of a pair of set screws 9. On the front surface of the printed circuit board 8 is secured an arcuate conductor segment 10, and a group of circumferentially spaced apart electric contacts $a_1$ through $g_1$ are disposed along an arc radially outside of the arcuate conductor segment 10. Contact $a_1$ at one end of the group has a circumferential length about one half of that of the arcuate conductor segment 10.

In front of the printed circuit board 8 is positioned a sliding ring 11 of electric insulator which is formed with a radial operating member 12 adapted to extend through an arcuate groove 13 provided for iris ring 2. On the periphery of the iris ring 2 adjacent the groove 13 is marked a scale 14 indicating the photosensitivity of the photographic films and a plurality of notches 16 are formed on the outer edge of the groove 13 on the side opposite the scale 14, the notches cooperating with a pin 15 on the operating member 12 to form a click mechanism. A sliding element 19 having bifurcated contact pieces 17 and 18 at radial positions corresponding to those of arcuate conductor segment 10 and the group of contacts $a_1$ through $g_1$ is secured to the sliding ring 11 by means of a rivet 20. Sliding ring 11 is provided with an opening 21 close to sliding element 19 to receive a bent up lug 22a of a tear drop type light receiving element 22 of a circular ring configuration which is placed in front of the sliding ring 11. The engagement between lug 22a and opening 21 locks the relative movement between the sliding ring 11 and the tear drop type light adjusting element 22. The upper inner periphery of ring 11 is removed as at 23, and a tear drop shaped opening 24 of the tear drop type light adjusting element 22 is provided to oppose this removed portion 23. As shown in FIG. 1, the tear drop shaped opening 24 comprises a series of interconnected sub-openings A, $A_1$, $B_1$ ... $F_1$. The second opening $A_1$ is generally circular and has the largest area, the first opening A to the left of the second opening $A_1$ extends in the circumferential direction and exponentially decreases its radial width whereas openings $B_1$ to $F_1$ to the right of opening $A_1$ have nearly equal areas or configuration as the opening $A_1$.

Figure 2:
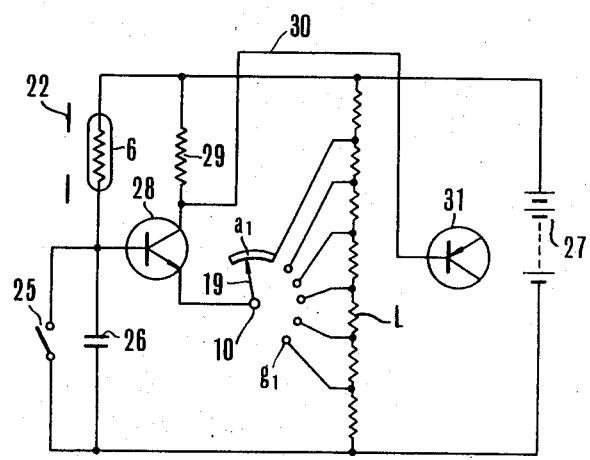
FIG. 2 shows an electric circuit of the electric shutter mechanism shown in FIG. 1.

The electric circuit associated with the electric shutter mechanism shown in FIG. 1 is shown in FIG. 2. More particularly, the quantity of light impinging upon the CdS element 6 is controlled by tear drop type light adjusting element 22 and the CdS element is connected to one pole of a DC source 27 through parallelly connected capacitor 26 and a trigger switch 25 which is arranged to be oppened when the shutter is opened. The juncture between CdS element 6 and capacitor 26 is connected to the base electrode of a transistor 28 to operate the transistor according to the charge of capacitor 26. The emitter electrode of transistor 28 is connected to conductor segment 10 whereas contacts $a_1$ through $g_1$ selectively engaged by sliding element 19 are connected to intermediate taps of a potentiometer resistor L. The collector electrode of transistor 28 is connected to the other terminal of source 27 through a resistor 29 and the juncture between resistor 29 and the collector electrode is connected to an amplifier transistor 31 through a conductor 30. The radial width of connecting sections $H_1$ between adjacent openings $A_1$ to $F_1$ is restricted as shown in FIG. 1. This is to decrease the quantity of light impringing upon the CdS element when adjacent pairs of contacts $a_1$ through $g_1$ are bridged by sliding element 19 for the purpose of compensating for the variation in the time constant of the circuit caused by this bridging. It is also possible to provide one auxiliary contact between each pair of adjacent contacts $a_1$ to $g_1$ so that when one of the restricted sections H is brought to aligne with CdS unit 6 the circuit elements connected to a particular auxiliary contact compensate for the variation in the circuit constants thus enabling to use an intermediate exposure set condition.

Figure 3:
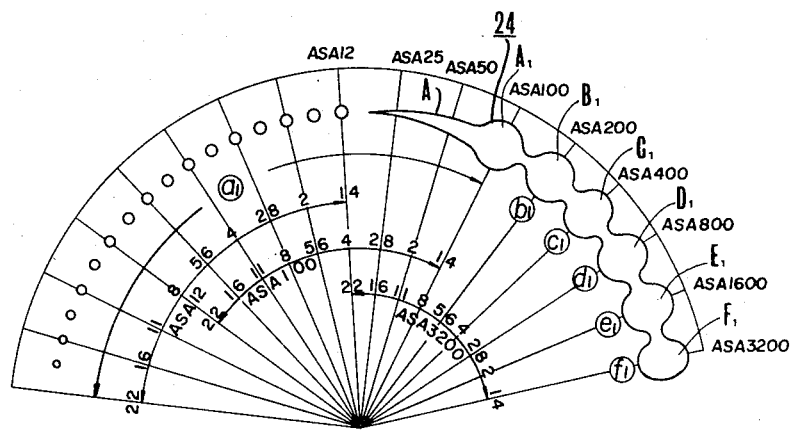
FIG. 3 is a diagram to explain the relationship between a tear drop type light receiving element and an iris ring in accordance with the switching operation of the film sensitivity.

In the electric shutter described above, the position of the largest opening $A_1$ of the tear drop shaped opening 24 or the maximum opening of the iris is selected to correspond to a suitable sentibility of the film, for example ASA 100, as shown in FIG. 3. It is possible to use the electric shutter mechanism for films of a wide range of photosensitivity by varying emitter voltage of transistor 28 without the necessity of increasing the area of openings $B_1$ to $F_1$, which otherwise are required to have wider areas than opening $A_1$. To have better understanding of this feature, reference should be made to FIG. 3 which shows the relationship between the sensitivity settings of the films and the iris settings.

In the example shown in FIG. 3, the position of the maximum opening $A_1$ of the tear drop shaped opening 24, that is the position of the full opening of the iris is made to correspond to a film sensitivity of ASA 100. Accordingly, where a film having a sensitivity of less than ASA 100, sliding element 19 is always maintained on contact $a_1$. For example, where a film of a sensitivity of ASA 100 is used and where the photographer selects a stop of F4 the tear drop type light adjusting element is rotated together with iris ring 2 to bring an opening of the tear drop shaped opening 24 corresponding to the full open position of ASA 12 to aligne with the CdS element 6. On the other hand, where a film of a sensitivity of ASA 400 is used, the photographer operates the operating member 12 to select the position of ASA 400 on the film sensitivity scale 14. Due to this manipulation the relative position between the iris ring 2 and the tear drop type light adjusting element 22 is varied so as to select contact $c_1$ by sliding element 19, thus decreasing the emitter potential of transistor 19. Concurrently therewith, the position of opening $c_1$ of tear drop shaped opening 24 is brought to the position of a stop of 1,4, that is to the position of contact $c_1$. For this reason, as long as the stop of the camera is selected to be in the range of F 1,4 to F4 one of the contacts $c_1$ to $a_1$ is selected. Thus, the emitter potential of transistor 28 is varied in relation to the shutter opening time without varying the quantity of light impinging upon CdS element 6. On the contrary, where the iris ring 2 is rotated to a range of from F 4 to F 22, as the sliding element 12 is maintained on contact $a_1$, the emitter potential will not be varied, but instead only the area of the tear drop shaped opening 24 or the quantity of light received by CdS element 6 is varied.

Although in the embodiment described above, contacts $a_1$ through $g_1$ are used to vary the emitter potential of transistor 28, it should be understood that the invention is not limited to this particular arrangement and that the same object can be attained by providing a plurality of capacitors 26 which are selectively used or by using a plurality of resistors connected in parallel which are used selectively instead of the potentiometer L.

Instead of interlocking the tear drop type light adjusting element 22 with iris ring 2, it is also possible to interlock the former with a shutter speed ring depending upon the light value.

Figure 4:
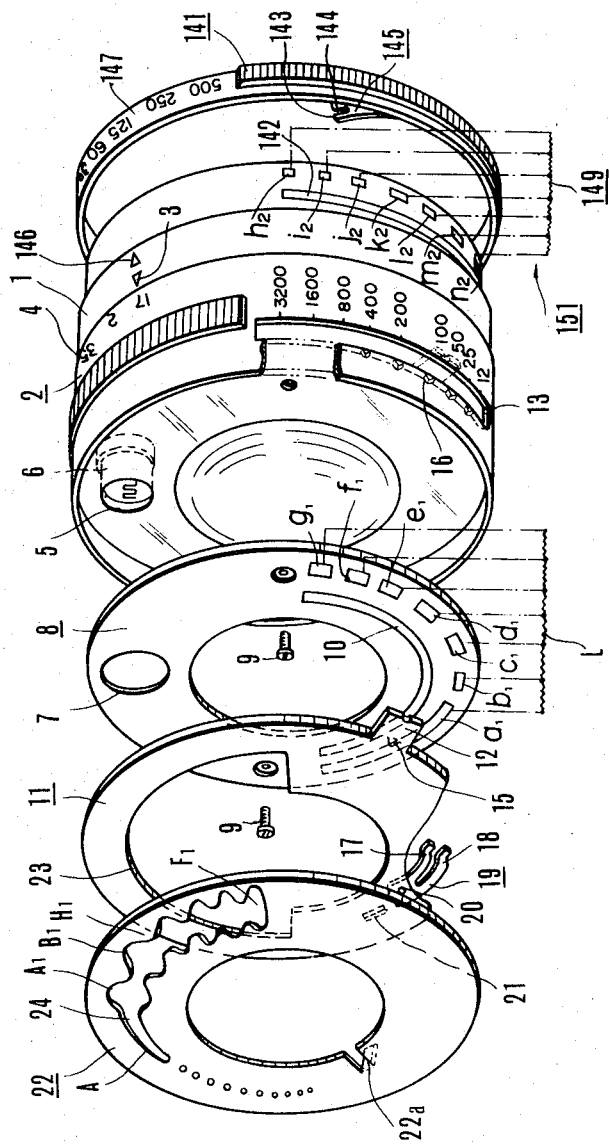
FIG. 4 shows an exploded view of a transistorized exposure meter embodying the invention.
Figure 5:
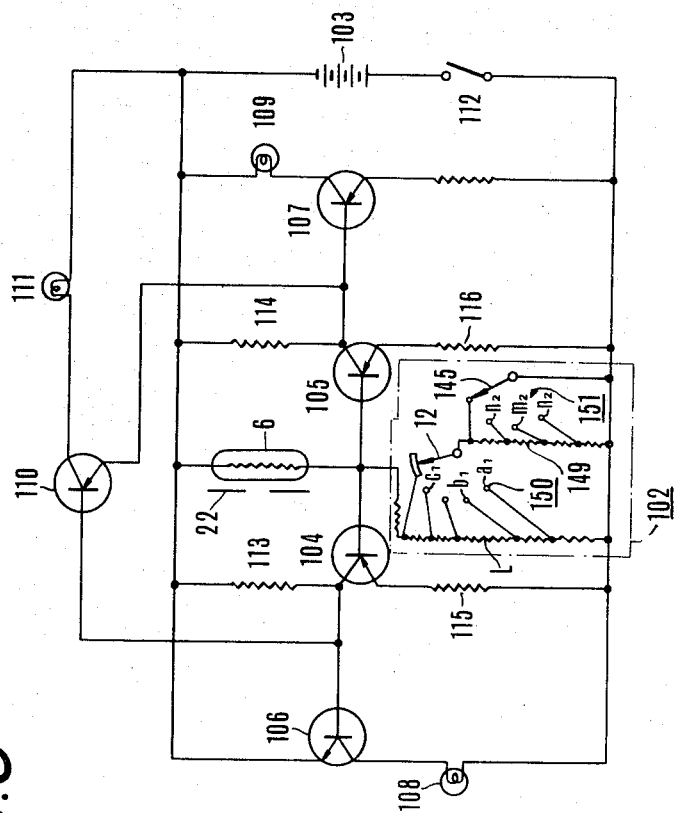
FIG. 5 is an electric circuit of the transistorized exposure meter shown in FIG. 4.

FIGS. 4 and 5 show a modified embodiment of this invention as applied to a transistor exposure meter. To have clear understanding of this modification, an electric circuit of the transistor exposure meter shown in FIG. 5 will first be described. A CdS element 6 responsive to the brightness of an object (not shown) is connected to one terminal of a source of DC 103 in series with a circuit constant setter 102 to be described later. To the juncture between CdS element 6 and circuit constant setter 102 are connected the base electrodes of switching transistors 104 and 105 having slightly different operating points. Collector electrodes of these switching transistors are connected to base electrodes of amplifier or output transistors 106 and 107, respectively. Display lamps 108 and 109 are connected in series with the collector electrodes of respective transistors for selectively displaying the excess exposure and under exposure conditions. The base-emitter electrode of transistor 110 is connected across the collector-emitter circuits of switching transistors 104 and 105 so as to render conductive transistor 110 when one of the switching transistors is rendered conductive. Between the collector electrode of transistor 110 and the other pole of source 103 is connected a third display lamp 111 which is lighted for displaying an inadequate exposure. A source switch 112 is connected between source 103 and circuit constant setter 102 and fixed resistors 113 and 114 are connected between the collector electrodes of respective switching transistors 157 and 105 and the other pole of the source 103. Further, fixed resistors 115 and 116 are connected in series with emitter electrodes of transistors 104 and 105, respectively, for the purpose of adjusting the operating points thereof, the value of resistors 114 being selected to be higher than that of resistor 115. Display lamps 108, 109 and 111 are assembled in a common casing, for example, a finder of the camera so that lighting of any one of then gives the indication regarding whether the exposure is adequate or not.

As shown in FIG. 4, the transistor exposure mechanism has substantially the same construction as the shutter mechanism shown in FIG. 1 so that corresponding parts are designated by the same reference numerals, and discription thereof is believed unnecessary.

To the rear of lens cylinder 1 is rotatably mounted a shutter speed setting ring 147 which can be set to any selected position by a click mechanism not shown. A conductor segment 142 is mounted on the periphery of the lens cylinder 1 and a plurality of circumferentially spaced apart electric contacts $n_2$ to $h_2$ are provided on the periphery of the lens cylinder adjacent the segment 142. A sliding element 145 having bifurcated contact pieces 143 and 144 which are adapted to selectively engage segment 142 and contacts $n_2$ to $h_2$ is secured to the inner surface of the shutter speed setting ring 141. The shutter speed setting ring 141 is also provided with a scale 147 representing the shutter speed. Consequently, when a desired shutter speed is selected by aligning an arrow mark 146 on the lens cylinder 1 with a desired shutter speed, the sliding element 145 selects one of the contacts $n_2$ to $h_2$ corresponding to the selected shutter speed. As will be described later contacts $n_2$ to $h_2$ may be substituted by a continuous resistance film. These contacts are connected to corresponding taps of a potentiometer 149. A first switching mechanism 150 (see FIG. 5) comprising contacts $a_1$ through $g_1$ sliding element 12 and potentiometer L (which are shown in FIGS. 1 and 2), and a second switching mechanism 151 comprising contacts $n_2$ to $h_2$, sliding element 145 and potentiometer 149 constitute circuit constant setter 102 as shown in FIG. 5.

To use the transistor exposure meter, operating member 12 is adjusted with respect to iris setting ring 2 in accordance with the sensitivity of the film used and then the source switch 112 is closed. After setting the iris setting ring 2 and shutter speed setting ring 147 to a desired opening of the iris and to a desired shutter speed the camera is directed to the object to be photographed. Whether the exposure condition thus set is correct or not is displayed by the lighting of one of the display lamps 108, 109 and 111.

More particularly, in the case of under exposure, the CdS element 6 will manifest a relatively high resistance value so that PNP-transistors 104 and 105 with their base electrodes supplied with a voltage determined by the ratio of the resistance of the CdS element to the preset resistance of the first and second switching mechanisms 150 and 151 are both non-conductive. Under these conditions, NPN-transistor 106 is maintained non-conductive because its base electrode is biased by a negative potential, whereas, another PNP-transistor 107 is rendered conductive thus lighting display lamp 109 to display the under exposure condition. During this time, transistor 110 is maintained non-conductive because its base and emitter electrodes are maintained at the same potential. Where the desired exposure is set, the resistance of the CdS element is decreased to a value lower than that of the under exposure, thus applying a more negative potential to the base electrodes of transistors 104 and 105. As a consequence, transistor 105 having a relatively higher emitter potential is rendered conductive to render output transistor 107 non-conductive. On the other hand, the emitter potential of transistor 104 is relatively low owing to the inclusion of resistor 115 so that the transistor 104 is not rendered conductive with such lower base potential, thus maintaining non-conductive the output transistor 106. Conduction of transistor 105 applies a positive potential to the emitter electrode of transistor 110 to render it conductive whereby lamp 111 is lighted to inform that the exposure condition set is correct.

Where the exposure condition set results in an excessive exposure, both transistors 104 and 105 are rendered conductive, which in turn, causes conduction of transistor 106 to light lamp 108. Conduction of both transistors 104 and 105 decreases the base-emitter voltage of transistor 110 thereby rendering it conductive.

Above described operation is the same as that of the prior art transistor exposure meter, but this embodiment is advantageous in that it is possible not only to decrease the number of contacts of the first switching mechanism 150 but also eliminate the drawback of providing the film sensitivity switching mechanism, that is the problem of complicating the mechanism and the response time of the photoelectric element or the CdS element. More particularly, it is possible to respond to a wide range of film sensitivity by positioning the largest opening $A_1$ of the tear drop shaped opening 24 to correspond to a suitable film sensitivity, for example ASA 100, as shown in FIG. 3 and without increasing the area of openings $B_1$ to $F_1$ which are otherwise required to have larger areas, but instead by adjusting the time constant of the circuit constant setter 102, in other words, by adjusting the voltage of DC source 103 by means of the potentiometer.

FIG. 3 is also useful to explain the relationship between the film sensitivity setting action and the setting of the iris setting ring 2. As above described, the position of the largest opening $A_1$ corresponds to the film sensitivity of ASA 100. Thus, where films of the sensitivity lower than ASA 100 are used, sliding element 19 is always in engagement with constant $a_1$. For example, for a sensitivity of ASA 100, when the user selects a stop of F 4, the tear drop type light adjusting element 22 is rotated together with iris setting ring 2 until an opening of the tear drop shaped opening 24 corresponding to the full open position for ASA 12 is brought to aligne with CdS element 6. Where a film of a sensitivity of ASA 400 is used, the user operates manually the operating member 12 to select the position of ASA 400 on the iris setting ring 2. This manual operation changes the relative position between iris setting ring 2 and tear drop type light adjusting element 22 to select contact $c_1$ by sliding member 12 to transfer the first switching mechanism so as to render conductive both transistors 104 and 105. Concurrently therewith, the opening $C_1$ of the tear drop type opening 24 is brought to a position corresponding to a stop of 1,4, that is contact $c_2$. In this manner, so long as the stop of the camera is selected within a range of F 1,4 to 4, one of the contact $c_1$ to $a_1$ is selected so that the quantity of light impinging upon CdS element 6 is maintained constant. However, the circuit constant of the circuit constant setter 102 is varied. On the contrary, where the iris setting ring 2 is set in a range of F 4 to F 22, the sliding element 19 will engage contact $a_1$ so that the circuit constant of circuit constant setter 102 will not be varied. But only the area of the tear drop shaped opening 24, that is the quantity of light supplied to CdS element 6 is varied.

Instead of serially connecting the first and second switching mechanism 150 and 151 of circuit constant setter 102 as shown in FIG. 5, these mechanisms may be combined in any desired manner. Furthermore, instead of interlocking the tear drop type light adjusting element 22 and iris setting ring 2 the former may be interlocked with the shutter speed setting ring 141 in view of the light value.

In this manner, this invention can greatly simplify the construction of the electric shutter mechanism or transistor exposure meter by interlocking a tear drop type light adjusting element that adjusts the light quantity to a photoelectric element with means for modifying the operating time of a transistor of a transistor exposure meter or with a switching mechanism of the circuit constant setter of the transistor exposure meter. This also makes it possible to respond to a wide range of film sensitivity. Moreover, according to this invention, as it is not necessary to make so small the area of the smallest opening of the tear drop type light adjusting element, it is possible to assure sufficient light quantity for the photosensitive element. Thus, it becomes possible to provide a small stop of F 32 without the necessity of high machining accurracy and the trouble of the response time of the photosensitive element as in the prior art.

While the invention has been shown and described in terms of preferred embodiments thereof it will be clear that many changes and modifications will occur to one skilled in the art within the scope of the invention as defined in the appended claims.

What is claimed is:

1. A camera including a mechanism for calculating the quantity of light exposure which can respond to a wide range of film sensitivity, said mechanism comprising a photosensitive element connected in an electric circuit for calculating the quantity of light exposure; a ring rotated in accordance with the desired exposure setting condition of the camera; a tear drop type light adjusting element adjustably connected to said ring in accordance with the photosensitivity of a photographic film used for said camera for varying the quantity of light received by said photosensitive element; means for releasably locking said light adjusting element in the adjusted position; a circuit constant setter in said calculating circuit; and switching means for switching said circuit constant setter in accordance with the relative position between the fixed portion of said camera and said tear drop type light adjusting element; said tear drop type light adjusting element having an opening so shaped that when using a photographic film having a photosensitivity less than a predetermined value, said switching mechanism is not actuated but only the quantity of the light impinging upon said photosensitive element is varied, whereas when using a photographic film having a photosensitivity higher than said predetermined value, the actuation of said switching means and said variation of said light quantity upon said photosensitive element are effected sequentially.

2. The camera according to claim 1 wherein said circuit for calculating the quantity of light exposure comprises a transistor exposure meter having a plurality of switching transistors connected to be selectively operated in accordance with the circuit constant of said circuit constant setter and the quantity of light received by said photosensitive element and a plurality of display lamps selectively lighted by said switching transistors.

3. The camera according to claim 1 wherein said tear drop type light adjusting element comprises a series of openings of equal area intercomed by restricted sections, and said switching mechanism comprises a plurality of contacts at positions corresponding to said openings and which are selected in accordance with the relative position between the fixed portion of said camera and said adjusting element.

4. The camera according to claim 3 wherein said switching mechanism further comprises a plurality of auxiliary contacts each positioned between adjacent two of said contacts so as to compensate for the variation in the circuit constant when one of said reduced sections are brought to aligne with said photosensitive element.

5. The camera according to claim 1 wherein said circuit for calculating the quantity of exposure comprises a portion of an electric shutter circuit including said photoelectric element and a transistor associated therewith and said switching mechanism is connected to determine the operating of said transistor in accordance with the relative portion between the fixed position of said camera and said tear drop type light adjusting element.

* * * * *